(12) United States Patent
Gilbert

(10) Patent No.: US 10,018,243 B1
(45) Date of Patent: Jul. 10, 2018

(54) VIBRATION ISOLATION OF ELECTRONICS AND/OR COMPONENTS

(71) Applicant: Steve L. Gilbert, Toquerville, UT (US)

(72) Inventor: Steve L. Gilbert, Toquerville, UT (US)

(73) Assignee: Steve L. Gilbert, Toquerville, UT (US)

( * ) Notice: Subject to any disclaimer, the term of this patent is extended or adjusted under 35 U.S.C. 154(b) by 36 days.

(21) Appl. No.: 14/577,518

(22) Filed: Dec. 19, 2014

Related U.S. Application Data

(60) Provisional application No. 61/919,402, filed on Dec. 20, 2013.

(51) Int. Cl.

| | | |
|---|---|---|
| *H05K 7/14* | (2006.01) | |
| *F16F 15/04* | (2006.01) | |
| *F16F 3/08* | (2006.01) | |
| *F16M 13/00* | (2006.01) | |
| F16F 15/08 | (2006.01) | |
| H02K 5/24 | (2006.01) | |
| G10K 11/00 | (2006.01) | |
| B60G 13/16 | (2006.01) | |
| B65G 27/32 | (2006.01) | |
| F04D 29/66 | (2006.01) | |

(52) U.S. Cl.
CPC .............. *F16F 15/04* (2013.01); *F16F 3/08* (2013.01); *F16M 13/00* (2013.01); *B60G 13/16* (2013.01); *B60G 2202/25* (2013.01); *B65G 27/32* (2013.01); *F04D 29/668* (2013.01); *F16F 15/046* (2013.01); *F16F 15/08* (2013.01); *G10K 11/002* (2013.01); *H02K 5/24* (2013.01)

(58) Field of Classification Search
CPC ........ H02K 5/24; G10K 11/002; B60G 13/16; B60G 2202/25; B65G 27/32; E21B 17/07; F04D 29/668; F16F 15/04; F16F 15/046; F16F 15/08; F16M 13/00
See application file for complete search history.

(56) References Cited

U.S. PATENT DOCUMENTS

| | | | | |
|---|---|---|---|---|
| 3,577,562 A | * | 5/1971 | Holt | ........................ A42B 3/10 2/414 |
| 4,043,708 A | | 8/1977 | Greenfield | |
| 5,347,507 A | * | 9/1994 | Kuhn | ..................... G11B 33/08 720/693 |
| 5,377,089 A | | 12/1994 | Miller | |

(Continued)

FOREIGN PATENT DOCUMENTS

| | | |
|---|---|---|
| EP | 1649189 | 7/2011 |
| JP | 2000002156 | 1/2000 |
| RU | 2318118 | 2/2008 |

OTHER PUBLICATIONS

U.S. Appl. No. 61/919,402, filed Dec. 20, 2013, Gilbert.

(Continued)

*Primary Examiner* — James Wu
(74) *Attorney, Agent, or Firm* — Workman Nydegger

(57) ABSTRACT

Implementations of the present invention relate to devices, systems, and methods for isolating electronic components from input vibrations. The vibration isolation device may passively isolate the housed electronics from substantially all input vibrations. The vibration isolation device may include elastic members to suspend the electronic components within a support frame such that input vibrations are unable to directly influence the electronic components.

19 Claims, 10 Drawing Sheets

(56) References Cited

U.S. PATENT DOCUMENTS

| | | | |
|---|---|---|---|
| 5,521,447 | A | 5/1996 | Bertolini et al. |
| 5,896,000 | A | 4/1999 | Shniper |
| 6,050,890 | A | 4/2000 | Bayer et al. |
| 6,371,434 | B1 * | 4/2002 | Becker ............... F16F 15/04 248/610 |
| 6,593,674 | B2 | 7/2003 | Sanchez et al. |
| 6,809,916 | B2 * | 10/2004 | Nakata ............... F16F 1/025 361/115 |
| 7,568,565 | B2 * | 8/2009 | McFarland ........... F16F 7/104 188/380 |
| 2005/0013110 | A1 | 1/2005 | Shah et al. |
| 2006/0117812 | A1 * | 6/2006 | Wee ............... D06F 37/20 68/23.1 |
| 2006/0165241 | A1 * | 7/2006 | Reid ............... G09B 23/14 381/59 |
| 2009/0256018 | A1 | 10/2009 | Young et al. |
| 2012/0247832 | A1 | 10/2012 | Cramer et al. |
| 2014/0079548 | A1 * | 3/2014 | Rodriguez Tsouroukdissian ..... F03D 13/20 416/85 |

OTHER PUBLICATIONS

Veprik, A.M., Babitsky, V.I.; Vibration protection of sensitive electronic equipment from harsh harmonic vibration; Journal of Sound and Vibration, Nov. 16, 2000, pp. 19-30, vol. 238, Issue 1.

Veprik, A.M.; Vibration protection of critical components of electronic equipment in harsh environmental conditions; Journal of Sound and Vibration, Jan. 2, 2003, pp. 161-175, vol. 259, Issue 1.

Rivin, Eugene I.; Vibration isolation of precision equipment; Precision Engineering, Jan. 1995, pp. 41-56, vol. 17, Issue 1.

Vibration and shock isolation products Gardner, Inc. Source: https://www.gardnerinc.com/oem/literature/diesel/Tech%20Products%20Catalog.pdf Date Accessed: Nov. 26, 2013.

U.S. Army test and evaluation command common engineering test procedure vibration test TECP 700-700 Materiel Test Procedure 5-2-507 White Sands Missile Range; Apr. 10, 1967.

Allan D.; Internal vibration of electronic equipment resulting from acoustic and shaker-induced excitation Lockheed Missiles & Space Company Houston; The Shock and Vibration Bulletin, Bulletin 37, Part 3, Jan. 1968, pp. 1-231.

* cited by examiner

VIBRATION ISOLATION OF ELECTRONICS AND/OR COMPONENTS

CROSS-REFERENCE TO RELATED APPLICATIONS

This application claims priority to and the benefit of U.S. Provisional Patent Application No. 61/919,402 filed Dec. 20, 2013, entitled "VIBRATION ISOLATION OF ELECTRONICS," the disclosure of which is incorporated herein by reference in its entirety.

BACKGROUND

1. The Field of the Invention

Generally, this disclosure relates to vibration isolation. More specifically, the present disclosure relates to devices, systems, and methods regarding the vibrational isolation of electronic devices and/or components.

2. Background and Relevant Art

Electronic devices and components are prevalent in consumer, commercial, and industrial settings. Electronic devices and components are used in an increasing number of applications, and therefore, are exposed to a larger variety of adverse conditions on a regular basis. Electronic devices are no longer a carefully protected commodity, expected to fail at the first exposure to adverse conditions; rather, electronics are now expected to survive situations including remote locations, challenging weather, use in and around heavy machinery, and even military operations. However, at the same time, electronics have become smaller and lighter with finer wires and much denser concentrations of components. Because the electronics are more susceptible to physical damage, and because of the greater reliance on electronics functioning in all conditions, there is an increasing need to provide a protective housing to isolate electronic components from mechanical damage, such as due to vibration.

Vibration can damage electronic components due to repeated acceleration and deceleration of the materials over long periods of time. Vibration issues for electronic systems may include cracking or degeneration of circuit contacts, loosening of electrical connections, arcing damage, false operation or "bouncing" of relay contacts or thermostat contacts disrupting normal system operation, dust generation that may interfere with sensitive circuitry or with heat dissipation from electronics, internal stress or metal fatigue to electronic parts, head crashes on platen storage media, or even simple abrasion damage. For example, electronic components used to operate modern rock crushing equipment experience extremely harsh conditions and may serve as an approximate "worst-case scenario." The electronics mounted on the rock crushing equipment are exposed to nearly continual low frequency, very high amplitude vibrations that can easily shake components loose from the electronics themselves or from the surrounding housing that may then damage the sensitive electronics.

Attempts have been made in the past to isolate the on-board electronics of heavy machinery from vibration and/or harmonics. One approach has been to simply remove the electronics from the source of the vibration on the machinery (e.g., place the electronics on the ground away from the vibration source). Having a detachable assembly effectively "decouples" the transmission path of the vibrations from the source of the vibrations, such as the rock crushing equipment, and the electronics housing by anchoring the electronics housing on some other surface, such as the ground. However, this detachable assembly has significant drawbacks. The electronics assembly may itself be a large component of the system and removal by hand may not be feasible, demanding additional equipment that requires time and resources to manufacture, maintain, and operate. A mechanical, hydraulic, or pneumatic system intended to decouple the electronic components from the transmission path of the vibrations may be subjected to the same harsh vibrations, thereby merely exchanging one problem for another problem as the mechanical, hydraulic, or pneumatic system intended to prevent damage to the electronic components would be susceptible to damage and need repairs, which would demand time and resources.

Furthermore, a mechanical, hydraulic, or pneumatic system implemented to remove electronic components from the heavy machinery would only be implemented if the electronic components themselves are too heavy for an operator to remove by hand, in which case the removal system would likely need to be large and heavy, itself. While adding a large, heavy electronics removal system may be a small relative change in weight to an already heavy machine, it is desirable to limit the weight added, if possible.

Additionally, a mechanical, hydraulic, or pneumatic system used to remove the heavy electronic components from the source and isolating the electronics housing, for example, against the ground requires three assumptions. First, the ground is not the source of the vibrations. In many construction, extraction, or excavation applications, the earth itself is a transmitter of the vibrations. For example, for equipment such as a thumper truck, removing the electronic components to the ground is not a viable option. Thumper trucks are used as a seismic source for seismic surveys. Seismic surveys are commonly used in the extractive industries and to research subsurface formations. A thumper truck accelerates a large mass toward the ground. The resulting impact sends a powerful shockwave through both the truck and the earth surrounding the impact location. Removal of the electronic components from the vehicle to the ground would, of course, be ineffectual in such an application. Second, the vibrations must be present only when the associated machinery is stationary. In the case of excavation equipment, such as a bulldozer or loader, vibrations are generated during motion of the machinery. For that reason, electronic components must remain on-board the machinery to allow proper operation. Third, the application for which the machinery is designed must not require transit over uneven surfaces. The electronic components are susceptible to damage even when the machinery is not in operation. Many applications require travel over rough roads or over areas that have no roads. It would be desirable to isolate electronic components from vibrations at all times.

Passive vibration isolation devices have been attempted to isolate electronic components from vibrational damage. Bushings, and in particular automotive motor mounts, have been employed, for example, in rock crushing machinery with little success. Again, the vibrations created by the machinery tend to be low-frequency, high amplitude vibrations. Therefore, any bushings would need to be soft and allow with a high amount of compliance to ensure the vibrational motion of the electronics, or alternatively the support to which the electronics mount, does not exceed the limits of the bushings. Unfortunately, having a very heavy and very costly (in the case of rock crushing machinery electronics a half-ton, $30,000 object) placed upon very soft, highly compliant mounts is undesirable.

Manufacturers have also employed spring mounts, but spring mounts require extensive damping for use in vibrational applications. Springs, undamped, will transfer the vibrations and run the risk of amplifying the vibrations when near resonance of the system. To create a system with a long period that would not resonate with the input vibrations, a manufacturer may include soft springs with a low spring constant. However, such a spring would require more distance to travel, and creates the aforementioned problem of placing a 1,000 pound ("lb.") object on a soft mount. To address this problem, one could add springs, which would increase the restoring force for a given displacement of the electronics housing, but as one increases the stiffness of the springs, the duration of the resonant period shortens. Therefore, damping of the system becomes necessary again.

Rock crushing equipment is not the only example, however, as much heavy machinery may generate similar vibrations that could potentially damage electronic components, such as construction equipment, excavation equipment, extraction equipment, or truck, rail, or air transport. Furthermore, consumers are increasingly harsh and demanding on their personal electronics, while simultaneously become more dependent upon them. Therefore, the hard drive in a laptop is consequently more vulnerable and more valuable.

Consumer applications may be more challenging, as the variety of conditions to which consumers subject their personal electronics may be less predictable than the conditions in which commercial or industrial machinery is operated. Consumer applications may need vibrational dampening that operates in a large range of conditions, orientations, and dimensions. For example, while the vibrations experienced by rock crushing machinery are fairly predictable in frequency, amplitude, and direction, the vibrations encountered by a consumer laptop may be due to a constant high frequency vibration of a jet turbine engine during air travel, or a single large amplitude impact such as dropping the device on the floor in an inverted position.

It is therefore desirable to vibrationally isolate the electronic components of a device cheaply and reliably from a wide range of shocks from many directions.

BRIEF SUMMARY

Implementations of the present disclosure address one or more of the foregoing or other problems in the art with devices, systems, and methods for vibrational isolation of electronic components. In particular, implementations of the present disclosure related to vibrational isolation of electronic components from input vibrations due to machinery.

In an embodiment, a vibration isolation device may comprise an isolated member that houses the electronics to be isolated from input vibrations. The isolated member may then be disposed within a support frame and suspended by elastic members connected thereto. The elastic members may comprise the same type of material or different elastic members may comprise different materials. The elastic members may be disposed on substantially opposing sides of the isolated member to prevent swaying or twisting of the isolated member and damp down oscillations of the isolated member.

In a further embodiment, the vibration isolation device may comprise a retention device such that the isolated member may be substantially fixed relative to the support frame. The retention device may comprise a pre-tensioning device that also allows for selective pre-tensioning of the elastic members during operation.

In another embodiment, the vibration isolation device may comprise an isolated member and a support frame. The isolated member may be connected to the support frame by a plurality of elastic members, with each of the elastic members applying a force to the isolated member. The force applied by each elastic member to the isolated member may be decomposed into its constituent vectors. Each elastic member may apply a force having a vector that substantially opposes the vector of a force applied by another elastic member.

In a further embodiment, the elastic members may be disposed symmetrically. In another embodiment, the elastic members may be disposed with symmetry displaying at least two reflection planes, at least three reflection planes, or inversion symmetry.

In yet another embodiment, a method of vibrationally isolating electronic components is provided. A method may comprise housing electronic components in an isolated member, the isolated member disposed within a support frame, and the isolated member connected to the support frame with a plurality of elastic members. The elastic members may be configured to apply forces having vectors at least about 90° apart. The method may further comprise applying an input vibration to the support frame and then absorbing at least a part of the input vibration.

Additional features of the disclosure will be set forth in the description which follows, and in part will be obvious from the description, or may be learned by the practice of such embodiments. The features of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

Figure 1A:
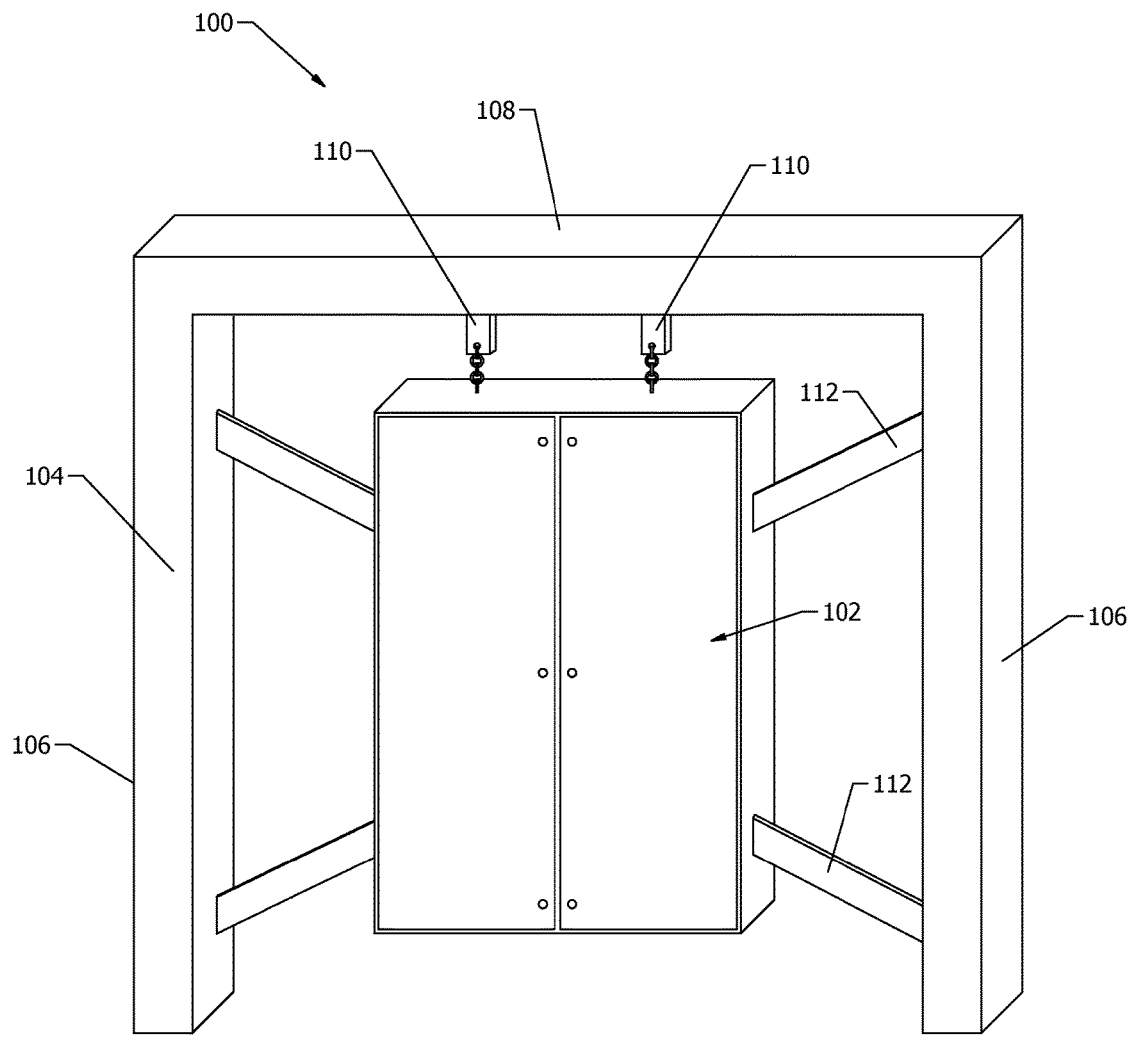
FIG. 1A is a perspective schematic view of a vibration isolation device according to the present application in which the isolated member is supported by a partially non-elastic member and is accessible during operation, according to at least one embodiment described herein.

One or more specific embodiments of the present disclosure will be described below. These described embodiments are examples of the presently disclosed techniques. Additionally, in an effort to provide a concise description of these embodiments, not all features of an actual implementation may be described in the specification. It should be appreciated that in the development of any such actual implementation, as in any engineering or design project, numerous implementation-specific decisions will be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

One or more embodiments of the present disclosure relate to vibration isolation. More specifically, the present disclosure relates to devices, systems, and methods regarding the vibrational isolation of electronic devices or components. While the following examples may highlight applications in heavy machinery, embodiments according the present application are not so limited. Embodiments disclosed herein may be adapted for scale and forces of differing applications without deviating from the spirit or essential characteristics described herein.

The challenge of vibration isolation may require the balancing of three competing goals. First, ideal vibration isolation may allow for sufficient displacement of the isolated component such that any energy due to input vibrations may be dissipated without harsh acceleration of the isolated component. Similarly, there may be sufficient displacement capable to ensure the isolated component does not interact directly with any mounting hardware or surrounding environment, thus negating any vibration isolation. Second, ideal vibration isolation may allow for the continuous application of force such that no sudden application of force causes additional acceleration. For example, any support provided to an isolated component may avoid a discontinuous force curve. Finally, the vibration isolation may provide damping to prevent any resonance with the input vibrations.

In some embodiments, these three considerations may be sufficiently addressed by suspending an electronic component using elastic members such that the electronic component becomes an isolated member in contact with the surrounding structure exclusively by the elastic members. The elastic suspension members may connect the isolated member to a surrounding support frame such that the isolated member is freely suspended above and/or away from all surfaces. The elastic suspension members may have sufficient compliance and a relatively low elastic modulus (e.g., less than that of the support frame) to ensure that the isolated member is not subjected to high acceleration from the input vibrations on the support frame. For example, the elastic suspension members and/or elastic dampening members may comprise nitrile rubber, butyl rubber, epichlorohydrin rubber, ethylene propylene diene monomer rubber, gum rubber, polyethylene rubber, latex rubber, neoprene rubber polyurethane, santoprene rubber, styrene-butadiene rubber, silicone rubber, vinyl rubber, flouroelastomer rubber, other elastic compound, or combinations thereof.

Elastic dampening members may be disposed around the isolated member such that the isolated member may resist swaying or resonant motion from the input vibrations. For example, the elastic members may be elastic cords, elastic straps, elastic belting strips, or elastic panels. In particular, elastic dampening members may be used in applications which require frequent transport of the isolated electronic components or for applications in which the device may be subjected to a constant vibration input for a duration sufficient to produce resonant motion. Furthermore, the elastic suspension members and the elastic dampening members may dissipate energy upon extension and contraction to damp down oscillations in the device. As used herein to describe and reference figures, like reference characters may refer to like structures.

Figure 1B:
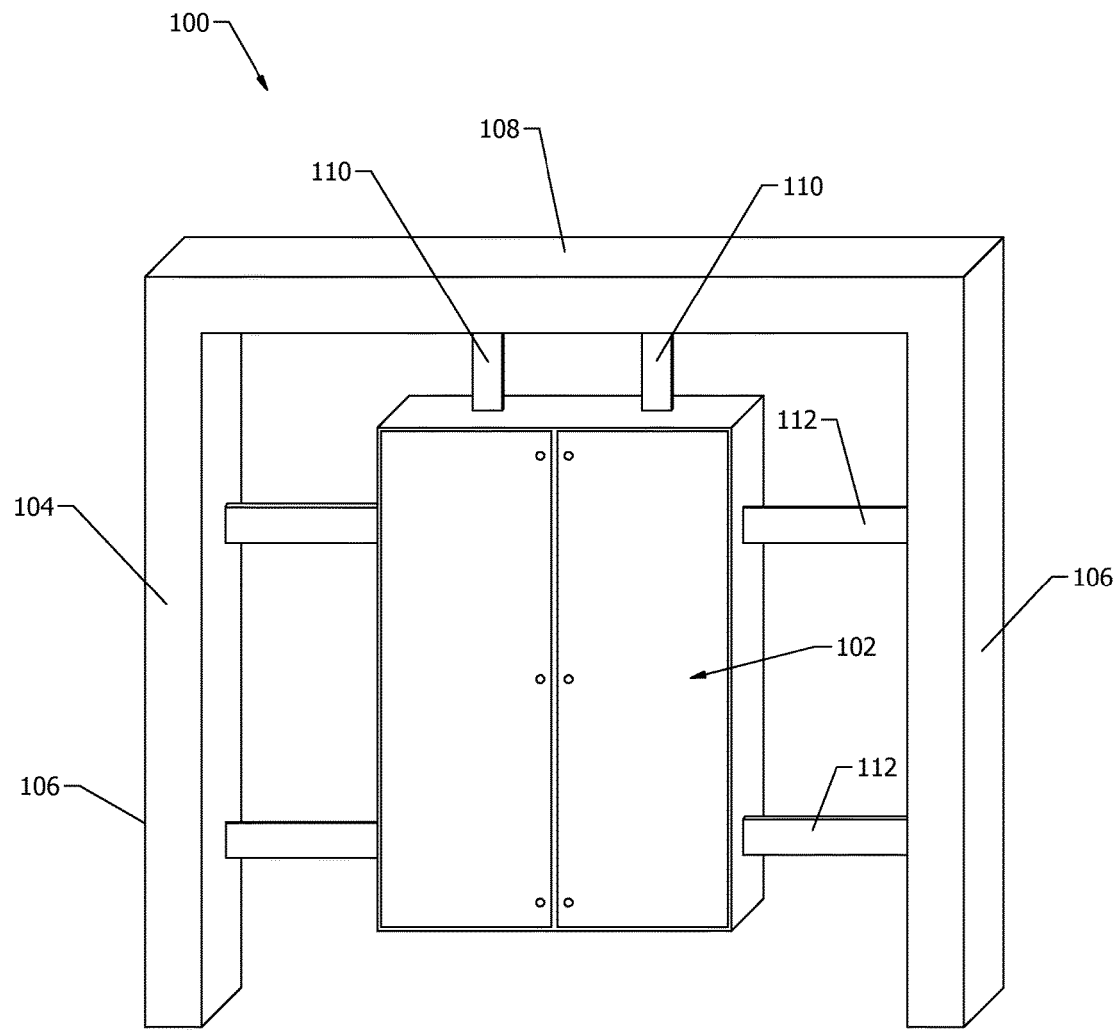
FIG. 1B is a perspective schematic view of a vibration isolation device according to the present application in which the isolated member is supported by an elastic member and accessible during operation, according to at least one embodiment described herein

Referring now to FIGS. 1A and 1B, a vibration isolation device 100 may comprise an isolated member 102 such as a housing configured for the housing of electronic equipment therein. The embodiments illustrated in and elements described in relation to FIGS. 1A and 1B are example combinations of such elements, but contemplated combinations should not be considered inclusive of all recited elements or exclusive of additional elements. Additional embodiments may describe additional elements, which may be combined with elements of any other embodiment described herein. The isolated member 102 may be supported by a support frame 104 that comprises at least one side support 106 and a top support 108. The embodiments depicted in FIGS. 1A and 1B are designed to allow access to the isolated member 102 that houses the electronic components, and therefore, the support frame 104 is shown with only two side supports 106; however, the support frame 104 may have more than two side supports 106.

The isolated member 102 may be suspended from the top support 108 by one or more elastic suspension members 110. The one or more elastic suspension members 110 may include a non-elastic portion, as shown in FIG. 1A, or may connect the isolated member 102 to the top support 108 directly, as shown in FIG. 1B. An elastic suspension member 110 having a non-elastic portion, such as the chains depicted in FIG. 1A, may allow the vibration isolation device 100 to accommodate isolated members 102 of varying dimensions (e.g., isolated members 102 of differing heights) without altering the one or more elastic suspension members 110. The one or more elastic suspension members 110 may comprise a material with an appropriate elastic modulus such that when the isolated member 102 is suspended therefrom, the isolated member 102 is suspended approximately in the center of the support frame 104. For example, the one or more elastic suspension members 110 may comprise a material having a lower elastic modulus (i.e., a material that is more elastic) than the support frame. The one or more elastic suspension members 110 may comprise rubber, such as nitrile rubber, butyl rubber, epichlorohydrin rubber, ethylene propylene diene monomer rubber, gum rubber, polyethylene rubber, latex rubber, neoprene rubber polyurethane, santoprene rubber, styrene-butadiene rubber, silicone rubber, vinyl rubber, flouroelastomer rubber; other elastomer compounds; textile materials; leather; metals; or combinations thereof. The equilibrium position may be the position to which the device 100 restores the isolated member 102 after application of input vibrations through the support frame 104 or any other displacement of the isolated member 102. After displacement of the isolated member 102, the isolated member 102 may be restored to the equilibrium position at least partially by one or more elastic dampening members 112.

In some embodiments, the elastic dampening members 112 may apply a net zero force on the isolated member 102 such that the elastic dampening members 112 themselves will not move the isolated member 102 from the equilibrium position, but may apply a net force to the isolated member 102 when the isolated member 102 is displaced from the equilibrium position. For example, one or more of the elastic dampening members 112 may apply no force to the isolated member 102 when the isolated member 102 is in the equilibrium position, while one or more of the elastic dampening members 112 may experience a tension force, and hence apply an opposing force, when the isolated member 102 displaces from the equilibrium position.

In other embodiments, the elastic dampening members 112 may each apply a force to the isolated member 102, the force applied by each elastic dampening member 112 having a vector component substantially opposing a vector component of a force applied by another elastic dampening member 112. For example, one or more of the elastic dampening members 112 may experience a tension force, and hence apply an opposing force, when the isolated member 102 is in the equilibrium position. In such an example, the force applied by an elastic dampening member 112 may be at least partially balanced by an opposing force applied by another elastic dampening member and/or another elastic suspension member 110. In yet other embodiments, the elastic dampening members 112 and the elastic suspension members 110 are configured such that at least two of the elastic dampening members 112 and elastic suspension members 110 apply tension forces to the isolated member 102 having vectors at least about 90° apart. For example, two elastic dampening members 112 may be positioned between and connect the isolated member 102 and the support frame 104. The two elastic dampening members 112 may experience tension forces when the isolated member 102 is in an equilibrium position, and a direction of the tension forces may be approximately 180° from one another.

Similarly to the elastic suspension members 110, elastic dampening members 112 may comprise any material with an appropriate elastic modulus such that the isolated member 102 may displace within the support frame 104 without its position substantially exceeding the dimensions of support frame 104. For example, the elastic dampening members 112 may comprises rubber, such as nitrile rubber, butyl rubber, epichlorohydrin rubber, ethylene propylene diene monomer rubber, gum rubber, polyethylene rubber, latex rubber, neoprene rubber polyurethane, santoprene rubber, styrene-butadiene rubber, silicone rubber, vinyl rubber, flouroelastomer rubber; other elastomer compounds; textile materials; leather; metals; or combinations thereof. In some embodiments, the one or more elastic suspension members 110 may comprise the same material as the one or more elastic dampening members 112. In other embodiments, the one or more elastic suspension members 110 may comprise different materials from the one or more elastic dampening members 112.

In an embodiment, elastic suspension members 110 and elastic dampening members 112 may comprise elastic cords. In a further embodiment, elastic suspension members 110 and elastic dampening members 112 may comprise sheathed elastic cords, commercially known as BUNGEE cords. In embodiments with sheathed elastic cords as at least one of the elastic dampening members 112, the sheathed elastic cords may vary in thickness or diameter. For example, in some embodiments, the sheathed elastic cords may be about one inch in diameter or may exceed one inch in diameter. In yet another embodiment, the elastic suspension members 110 and elastic dampening members 112 may comprise elastic sheets, the elastic sheets providing substantially equal force along the length of their connection to the support frame 104 and to the isolated member 102. For example, an elastic sheet may connect the isolated member 102 along a length of one or more side supports 106 and/or top support 108. The elastic sheet may connect the isolated member 102 to the top support along a length of the top support 108 that is a percentage of the full length of the isolated member 102. In some embodiments, an elastic sheet may connect the isolated member 102 to a side support 106 or top support 108 along a percentage of the length of the isolated member 102 in a range having upper and lower values including any of 10%, 20%, 30%, 40%, 50%, 60%, 70%, 80%, 90%, 100%, or any value therebetween. For example, an elastic sheet may connect the isolated member 102 to a top support 108 along between 50% and 100% of a full length of the isolated member 102. In other examples, an elastic sheet may connect the isolated member 102 to a top support 108 along between 60% and 90% of a full length of the isolated member 102. In yet other examples, an elastic sheet may connect the isolated member 102 to a top support 108 along between 70% and 85% of a full length of the isolated member 102.

Elastic dampening members 112 may also provide a net force on the isolated member 102 such that a second equilibrium position may be created after the elastic dampening members 112 are connected to the isolated member 102 and the support frame 104. For example, the elastic dampening members 112 may provide a net force downward from the first equilibrium position, such that the second equilibrium position is lower relative to the top support 108. When the isolated member 102 is in an equilibrium position, the elastic dampening members 112 may experience a tension force such that each elastic dampening member 112 applies a force to the isolated member 102. The forces applied by the elastic dampening members 112 may be balanced by other elastic dampening members 112, by the elastic suspension members 110, by a gravitational force (not depicted in FIGS. 1A and 1B), or by another force. In an embodiment, the elastic dampening members 112 may be disposed with at least two planes of symmetry. For example, as depicted in FIGS. 1A and 1B, there may be two vertical planes of symmetry disposed at 90° from one another. In another embodiment, the elastic dampening members 112 may be disposed with inversion symmetry about the center of the isolated member 102. For example, a plurality of) elastic dampening members 112 may be positioned around the isolated member 102 and connecting the isolated member 102 and the support frame 104 such that each elastic dampening member 112 is in line with another elastic dampening member 112 on an opposing side of the isolated member 102. In yet another embodiment, the elastic dampening members 112 may be disposed with at least three planes of symmetry.

With the elastic dampening members 112 under tension at the equilibrium position, an input vibration applied to the support frame 104 may displace the isolated member 102 from the equilibrium position relative to the support frame 104 and the net force on the isolated member 102 may change linearly and/or continuously. The elastic dampening members 112 may be disposed such that the isolated member 102 may displace relative to the support frame 104 without any of the elastic dampening members 112 becoming slack. A slack elastic dampening member 112 may result in a discontinuous force curve during displacement of the isolated member 102 from the equilibrium position. A discontinuous force curve may result in undesirable or unnecessary vibration in the isolated member 102. To ensure the isolated member 102 of device 100 is restored to its equilibrium point with minimal twisting and/or swaying, the elastic dampening members 112 may further comprise upper dampening members having a modulus of elasticity greater than a modulus of elasticity of lower dampening members to generate similar forces on the isolated member 102 when a lower portion of the isolated member 102 displaces more than a upper portion. In some embodiments, the upper dampening members may differ in modulus of elasticity relative to one another.

In some embodiments, the input vibration may have a frequency greater than about 40 Hertz (Hz), such as when the device 100 is subjected to vibrations during transportation. In other embodiments, the input vibration may have a frequency less than about 40 Hz, such as when the device 100 is subjected to vibrations due to a heavy machinery motor. In yet other embodiments, the input vibration may have a frequency less than about 15 Hz, such as when the device 100 is subjected to vibrations from a rock crusher motor and/or during crushing of rock.

The restoring force after a displacement of the isolated member 102 may be at least partially dependent on the force applied by the elastic dampening members 112. The portion of the restoring force due to the elastic dampening members 112, when the elastic dampening members 112 are under tension at the equilibrium position, may be the net force of the elastic dampening members 112 applied to the isolated member 102. In the embodiments depicted in the FIGS. 1A and 1B, a lateral displacement toward one of the side supports 106 may result in an increase in the force applied by one or more of the elastic dampening members 112 and an associated decrease in the force applied by one or more of the elastic dampening members 112 positioned on the opposing side of the isolated member 102. Conversely, therefore, the transmission of force and/or energy from the support frame 104 to the isolated member 102 is lowest when the isolated member 102 remains at the equilibrium point. When input vibrations enter the device 100 at the support frame 104, the vibrations may move the support frame 104 with little transmission of the vibrations to the isolated member 102 at the equilibrium point.

FIGS. 1A and 1B depict a vibration isolation device 100 intended for use in a mobile rock crushing machine, and therefore, the orientation of the device 100 is known and access to the isolated member 102 is necessary for the operation of the machinery. However, other embodiments of the present disclosure are possible in other applications in which access to the isolated member 102 during operation is unnecessary.

Figure 2:
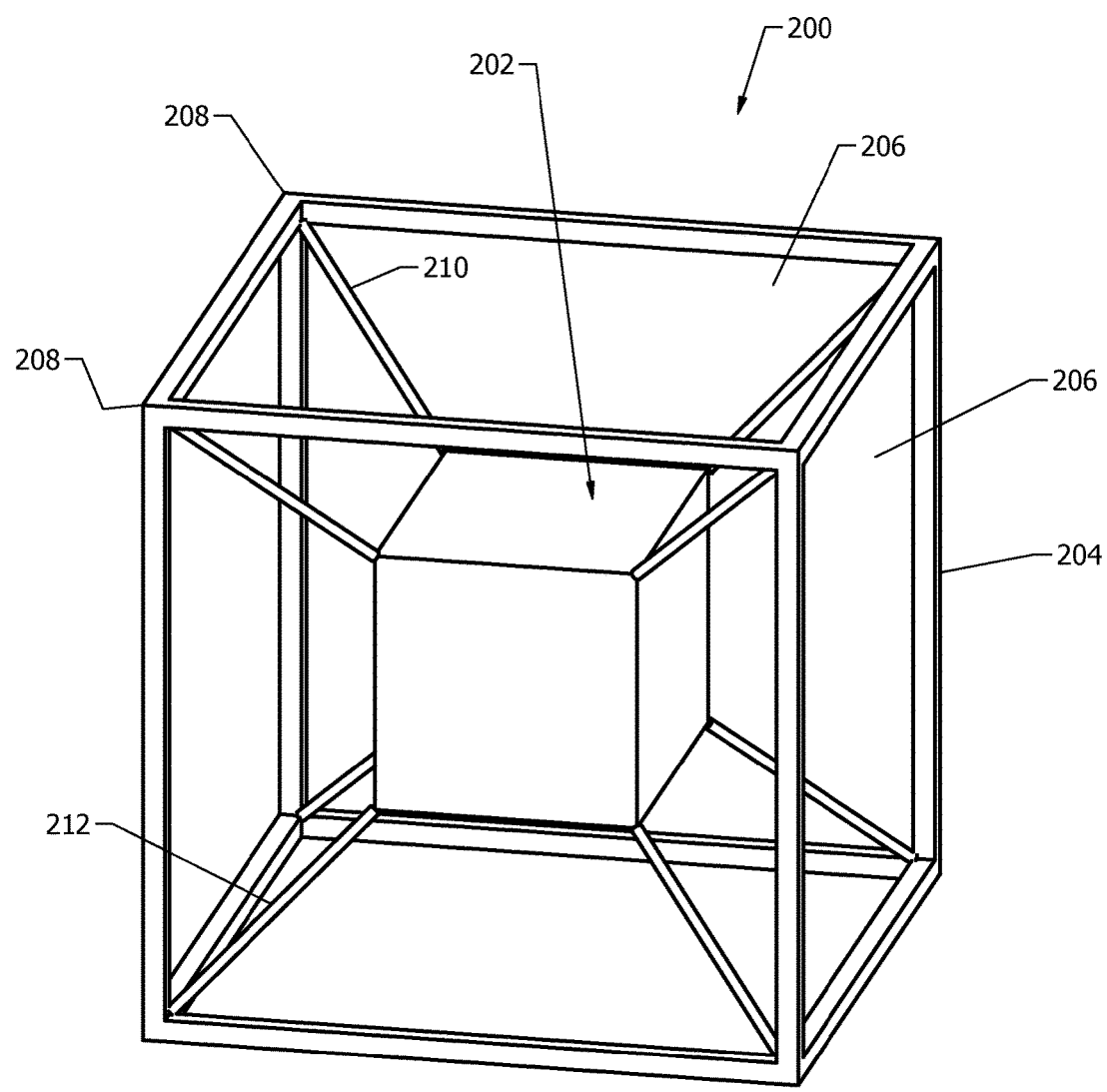
FIG. 2 is a perspective schematic view of another vibration isolation device according to the present application in which the vibration isolation is irrespective of orientation, according to at least one embodiment described herein.

FIG. 2 depicts a vibration isolation device 200 for use in an application that may not require access to the isolated member 202 during exposure to vibrations. The embodiment illustrated in and elements described in relation to FIG. 2 are example combinations of such elements, but contemplated combinations should not be considered inclusive of all recited elements or exclusive of additional elements. Additional embodiments may describe additional elements, which may be combined with elements of any other embodiment described herein. An example of such an application may be the vibrational isolation of a "black box" recorder in a transportation vehicle such as an airplane. In such an application, the vibration source may be air turbulence, vibration from taxiing across a surface, or vibration from operation of the engines or other machinery on the aircraft. Therefore, there is not a predetermined) direction to the vibration, and the device 200 may be configured to vibrationally isolate the isolated member 202 from any direction.

Because the isolated member 202 may not need to be accessed during routine operation, the vibration isolation device 200 may have a support frame 204 that encompasses the isolated member 202 with support frame sides 206 surrounding all sides of the isolated member 202. The support frame sides 206 and/or support frames 204, which may or may not be solid sides and/or frames, may meet at frame corners 208. For example, the support frames 204 may have apertures formed therein. The apertures may be elliptical, polygonal, otherwise shaped, or combinations thereof. In some embodiments, the elastic suspension members 210 and/or elastic dampening members 212 may connect to the corners of the isolated member 202 and the frame corners 208. In other embodiments, the elastic suspension members 210 and/or elastic dampening members 212 may connect to another part of the support frame 204 between the frame corners 208. In the embodiment illustrated in FIG. 2, the elastic suspension members 210 and the elastic dampening members 212 may be the same material. The device 200 may then dampen vibrations substantially equivalently irrespective of orientation of the input vibrations or of the device 200. In other embodiments, the device 200 may have a dominant orientation. For example, a flight recorder, while experiencing many orientations of acceleration and/or vibrations during use, may experience much greater acceleration in particular orientations. Therefore, the elastic suspension members 210 and elastic dampening members 212 may comprise different materials. Furthermore, the elastic suspension members 210 and elastic dampening members 212 may comprise different materials based on their orientation. For example, as depicted in FIG. 2, the elastic suspension members 210 may comprise a material with a higher modulus of elasticity than the elastic dampening members 212 because the elastic suspension members 210 may be responsible for suspending the mass of the isolated member 202, while the elastic dampening members 212 may be responsible exclusively for preventing swaying and/or motion of the isolated member 202.

As depicted in FIG. 2, the elastic suspension members 210 and elastic dampening members 212 are connected to the frame corners 208 and to the isolated member 202. The elastic suspension members 210 and elastic dampening members 212) are connected to the isolated member 202 at the corners of the isolated member 202. Connecting the elastic suspension members 210 and elastic dampening members 212 to corners of the isolated member 202 may apply a greater torque on the isolated member 202. Therefore, the acceleration of the isolated member 202 due to the elastic suspension members 210 and elastic dampening members 212 may be fine-tuned by the placement of the elastic suspension members 210 and elastic dampening members 212.

For example, the elastic suspension members 210 and elastic dampening members 212, depending on orientation, may need to suspend more or less of the weight of the isolated member 202. In an application with an isolated member 202 having a lower mass, the elastic suspension members 210 and elastic dampening members 212 may have a lower elastic modulus because they need to suspend less weight. However, decreasing the elastic modulus of the elastic suspension members 210 and elastic dampening members 212 would also affect the rate at which input vibrations are transmitted to the isolated member 202. Moving the connection of the elastic suspension members 210 and elastic dampening members 212 with the isolated member 202 further from the center of inertia of the isolated member 202 will provide greater torque on the isolated member 202 to maintain its orientation within the support frame 204.

Figure 3:
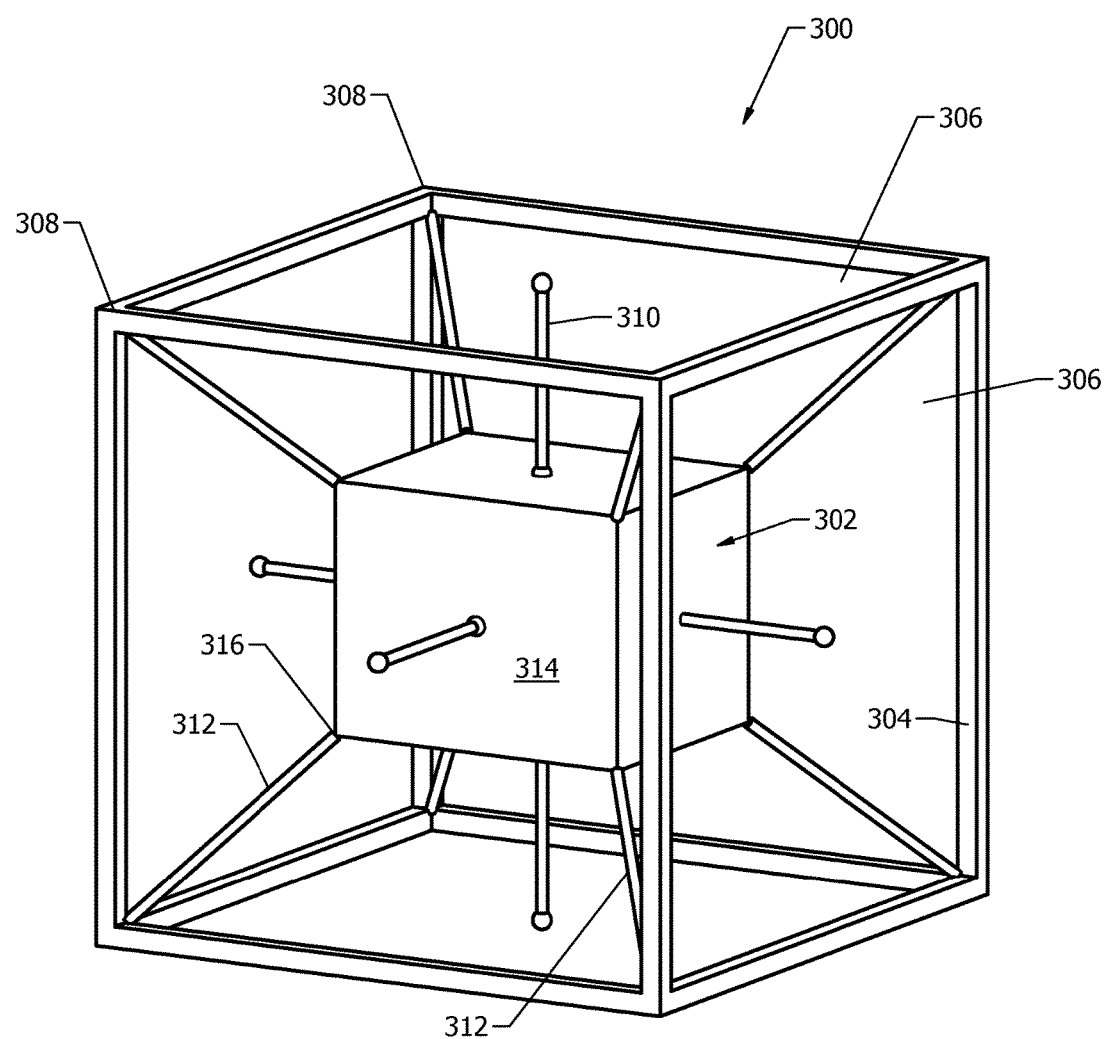
FIG. 3 is a perspective schematic view of yet another vibration isolation device according to the present application in which the vibration isolation is irrespective of orientation, according to at least one embodiment described herein.

FIG. 3 depicts an embodiment in which vibration isolation device 300 has an analogous isolated member 302 and support frame 304 with support sides 306, which meet at frame corners 308. (Support sides 306 are transparent for the purposes of FIG. 3.) The embodiment illustrated in and elements described in relation to FIG. 3 are example combinations of such elements, but contemplated combinations should not be considered inclusive of all recited elements or exclusive of additional elements. Additional embodiments may describe additional elements, which may be combined with elements of any other embodiment described herein. However, in the embodiment depicted in FIG. 3, the elastic suspension members 310 and elastic dampening members 312 are disposed in the center of the isolated member faces 314 and at the isolated member corners 316, respectively. The elastic suspension members 310 and elastic dampening members 312 may have different moduli of elasticity, as well. For example, the elastic suspension members 310 may have a higher modulus of elasticity than the elastic dampening members 312 such that the elastic suspension members suspend the mass of the isolated member 302 at the isolated member faces 314 and the elastic dampening members 312 apply torque to the isolated member corners 316. The vibration isolation device 300 depicted in FIG. 3 may have similar or identical vibration isolation properties irrespective of the orientation at which the device 300 is mounted.

Figure 4:
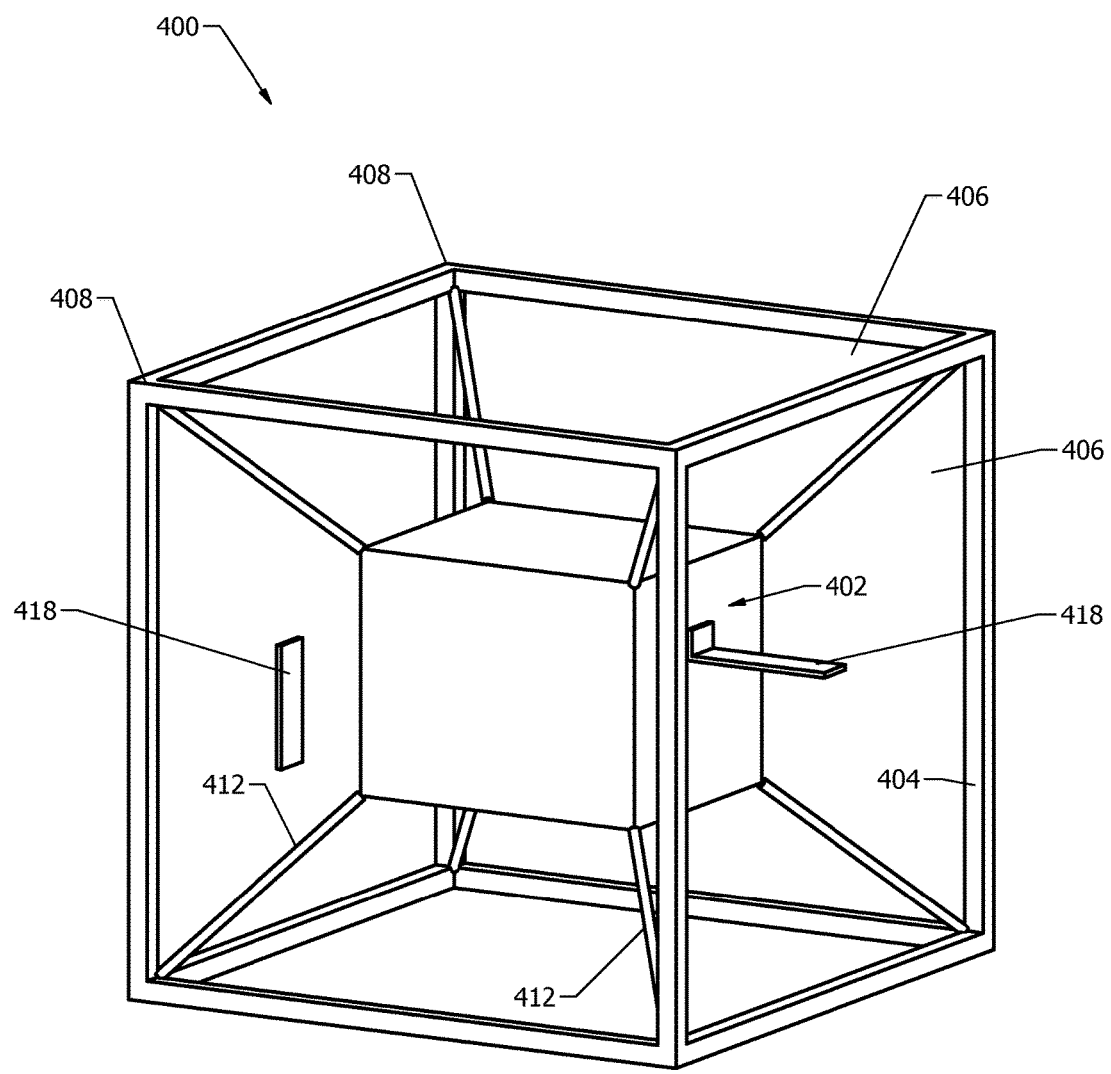
FIG. 4 is a perspective schematic view of the vibration isolation device of FIG. 2 further comprising a retention device, according to at least one embodiment described herein.

Referring now to FIG. 4, yet another embodiment of a vibration isolation device 400 is depicted. The embodiment illustrated in and elements described in relation to FIG. 4 are example combinations of such elements, but contemplated combinations should not be considered inclusive of all recited elements or exclusive of additional elements. Additional embodiments may describe additional elements, which may be combined with elements of any other embodiment described herein. For the purposes of FIG. 4, vibration isolation device 400 is depicted having an analogous structure to device 200 shown in FIG. 2, but may comprise an analogous structure to any of the embodiments described herein or combinations thereof. The vibration isolation device 400 may comprise an analogous isolated member 402, support frame 404, support sides 406, frame corners 408, and elastic suspension members 410 and elastic dampening members 412. In addition, vibration isolation device 400 may comprise a retention device 418.

As shown in FIG. 4, the retention device 418 may comprise a deployable bracket that, in a deployed state, may limit or substantially prevent motion of the isolated member 402. The retention device 418 may be selectively deployable or engageable to limit motion of the isolated member, for example, during transport of the device 400, when the device 400 is not subject to input vibrations, or when movement of the isolated member 402 would be undesired. For example, if the isolated member 402 comprises components that require maintenance, it may be desirable to fix the isolated member 402 relative to the support frame 404 such that the isolated member 402 does not move while a technician attempts to perform maintenance.

The retention device 418 may be a single bracket or, as depicted in FIG. 4, a plurality of brackets. In an embodiment, the retention device 418 may be a rigid member or a semi-rigid, resilient member. In another embodiment, the retention device 418 may be an inflatable member that may be selectively inflated to substantially occupy the space between the isolated member 402 and the support frame 404. In yet another embodiment, the retention device 418 may comprise a flexible, inelastic member (relative to the elastic suspension members 410 and/or elastic dampening members 412), such as rope or chain, that may selectively connect the isolated member 402 to the support frame 404 and thereby restrict the relative movement of the isolated member 402 and the support frame 404.

In a further embodiment, the retention device 418 may comprise a pre-tensioning device associated with the elastic suspension members 410 and/or elastic dampening members 412. By pre-tensioning the elastic suspension members 410 and/or elastic dampening members 412, the isolated member 402 may be subject to less displacement during transport or maintenance, such that other components may not be necessary. Additionally, the pre-tensioning device may pre-tension the elastic suspension members 410 and/or elastic dampening members 412 such that the isolated member 402 remains at the original equilibrium point, but any restoring force generated due to displacement of the isolated member 402 increases, effectively retaining the isolated member 402 without altering any geometry of the device 400.

Figure 5:
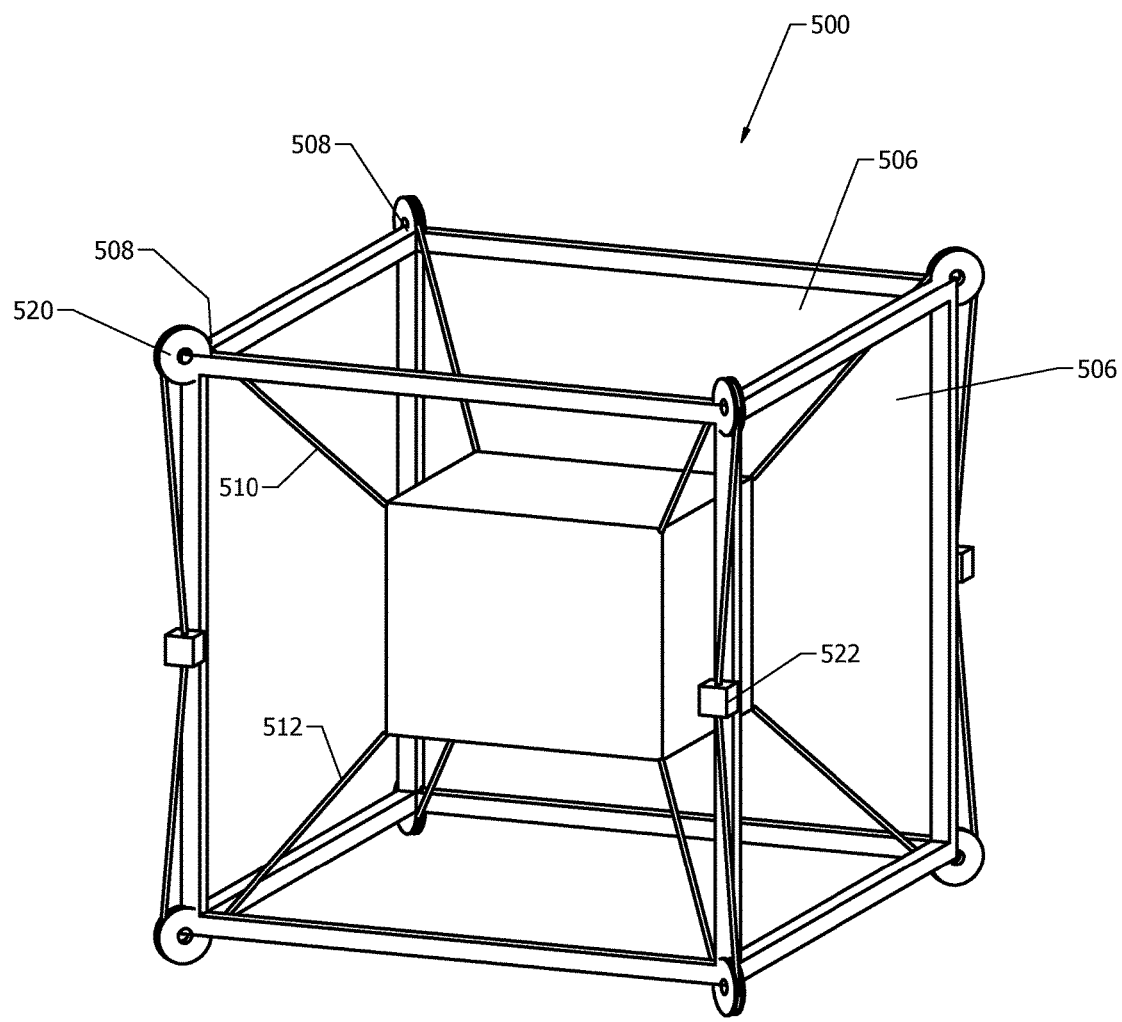
FIG. 5 is a perspective schematic view of the vibration isolation device of FIG. 2 further comprising an extension mechanism, according to at least one embodiment described herein.

In a yet further embodiment, a vibration isolation device 500 may comprise a substantially analogous structure to vibration isolation device 200 as depicted in FIG. 5, but also may comprise an analogous structure to any of the embodiments described herein. The embodiment illustrated in and elements described in relation to FIG. 5 are example combinations of such elements, but contemplated combinations should not be considered inclusive of all recited elements or exclusive of additional elements. Additional embodiments may describe additional elements, which may be combined with elements of any other embodiment described herein. Vibration isolation device 500 may comprise an analogous isolated member 502, support frame 504, support sides 506, frame corners 508, and elastic suspension members 510 and elastic dampening members 512. In addition, vibration isolation device 500 may comprise one or more extension mechanisms 520.

Extension mechanisms 520 may allow for greater extension of the elastic suspension members 510 and elastic dampening members 512 without approaching their elastic limits. It may be undesirable to approach the elastic limit of the elastic suspension members 510 and/or elastic dampening members 512 because near their elastic limit, the elastic suspension members 510 and/or elastic dampening members 512 will cease to behave with a linear elasticity. At which point, the elastic suspension members 510 and/or elastic dampening members 512 may no longer effectively isolate the isolated member 502 from input vibrations. Extension mechanisms 520 may allow use of longer elastic suspension members 510 and/or elastic dampening members 512, such that displacements of the isolated member 502 remain within the linear elastic deformation range of the elastic suspension members 510 and/or elastic dampening members 512.

As depicted in FIG. 5, the extension mechanisms 520 may be disposed at the frame corners 508, but may also be disposed at any point at which the elastic suspension members 510 and/or elastic dampening members 512 may connect to the support frame 504. For example, in the depicted embodiment in FIG. 5, the extension mechanism may be a mechanism that directs the elastic suspension members 510 and/or elastic dampening members 512 along a different direction to allow the use of longer elastic suspension members 510 and/or elastic dampening members 512 without requiring larger geometry of the device 500. Extension mechanism 520 may allow the elastic suspension members 510 and/or elastic dampening members 512 to continue beyond the frame corners 508 and connect to a further point on the support frame 504, such as mounting point 522. In an embodiment, the extension mechanisms 520 may be wheels, such as those depicted in FIG. 5. In another embodiment, the extension mechanisms 520 may comprise sliders, such as a slider comprising polytetraflouroethylene, polyurethane, perfluoroalkoxy, fluorinated ethylene propylene, another material having a similarly low coefficient of friction, or combinations thereof configured to allow the elastic suspension members 510 and/or elastic dampening members 512 to move over its surface with low friction and, therefore, less wear on the elastic suspension members 510 and/or elastic dampening members 512.

In an embodiment such as that depicted in FIG. 5, extension mechanisms 520 may enable the use of elastic suspension members 510 and/or elastic dampening members 512 of two or more times the length of the elastic suspension members 210 and elastic dampening members 212 of the vibration isolation device 200 as depicted in FIG. 2. Extension mechanisms 520 may enable vibration isolation device 500 to isolate the isolation member 502 from larger amplitude input vibrations than an embodiment without extension mechanisms 520.

In an embodiment, the extension mechanisms 520 may direct the elastic suspension members 510 and/or elastic dampening members 512 in a different direction without inhibiting the movement of the elastic suspension members 510 and/or elastic dampening members 512. In another embodiment, the extension mechanisms 520 may also comprise a secondary dampening mechanism. The secondary dampening mechanism may also be configured to dampen an extension or a contraction of the elastic suspension members 510 and elastic dampening members 512 past extension mechanism 520. For example, the extension mechanism 520 depicted in FIG. 5 may have a high viscosity lubricant such that the wheel in the extension mechanism 520 turns slowly, inhibiting the movement of the elastic suspension members 510 and elastic dampening members 512 past the extension mechanism 520.

Figure 6:
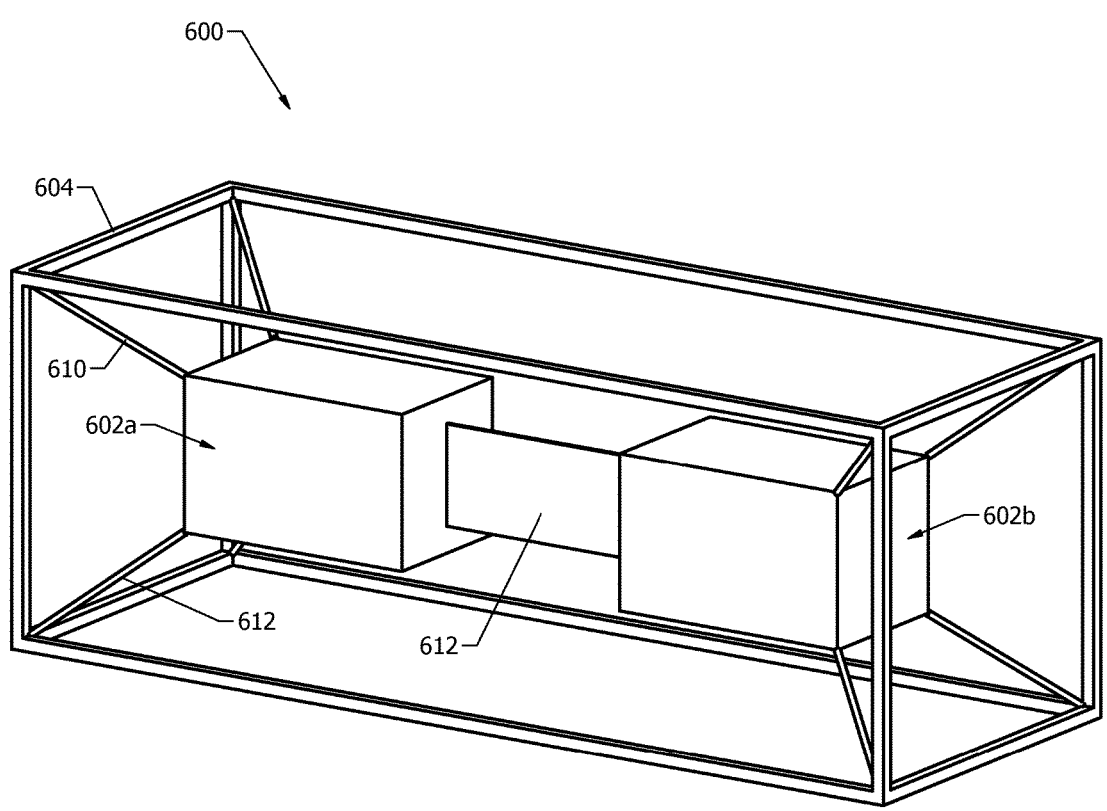
FIG. 6 is a perspective schematic view of a vibration isolation device according to the present application in which a plurality of isolated members are disposed within a support frame and connected to one another, according to at least one embodiment described herein.

In addition to the described embodiments, it may be desirable to isolate multiple isolated members within a single support frame. As shown in FIG. 6, in an embodiment, a vibration isolation device 600 may incorporate a first isolated member 602a and a second isolated member 602b disposed inside a support frame 604 and connected thereto by a plurality of elastic suspension members 610 or elastic dampening members 612. The embodiment illustrated in and elements described in relation to FIG. 6 are example combinations of such elements, but contemplated combinations should not be considered inclusive of all recited elements or exclusive of additional elements. Additional embodiments may describe additional elements, which may be combined with elements of any other embodiment described herein.

In an embodiment, such as that depicted in FIG. 6, the first and second isolated members 602a, 602b may be connected to one another horizontally via elastic dampening members 612 to dampen the transmission of vibrations therebetween. In another embodiment, the first and second isolated members 602a, 602b may be orientated vertically with respect to one another or the support frame 604. In yet another embodiment, multiple isolated members may be disposed horizontally and vertically with respect to one another forming a matrix of isolated members disposed within a support frame. For example, the matrix may have two dimensions, such as a 2×2×1 arrangement (corresponding to an X-Y-Z-directions convention) or a 2×1×2 arrangement. In a yet further embodiment, the matrix may have three dimensions, such as a 2×2×2 arrangement. For example, a 2×2×2 arrangement may form a cube of 8 isolated members that may each move at least partially independently of one another due to the elastic connections therebetween.

Figure 7A:
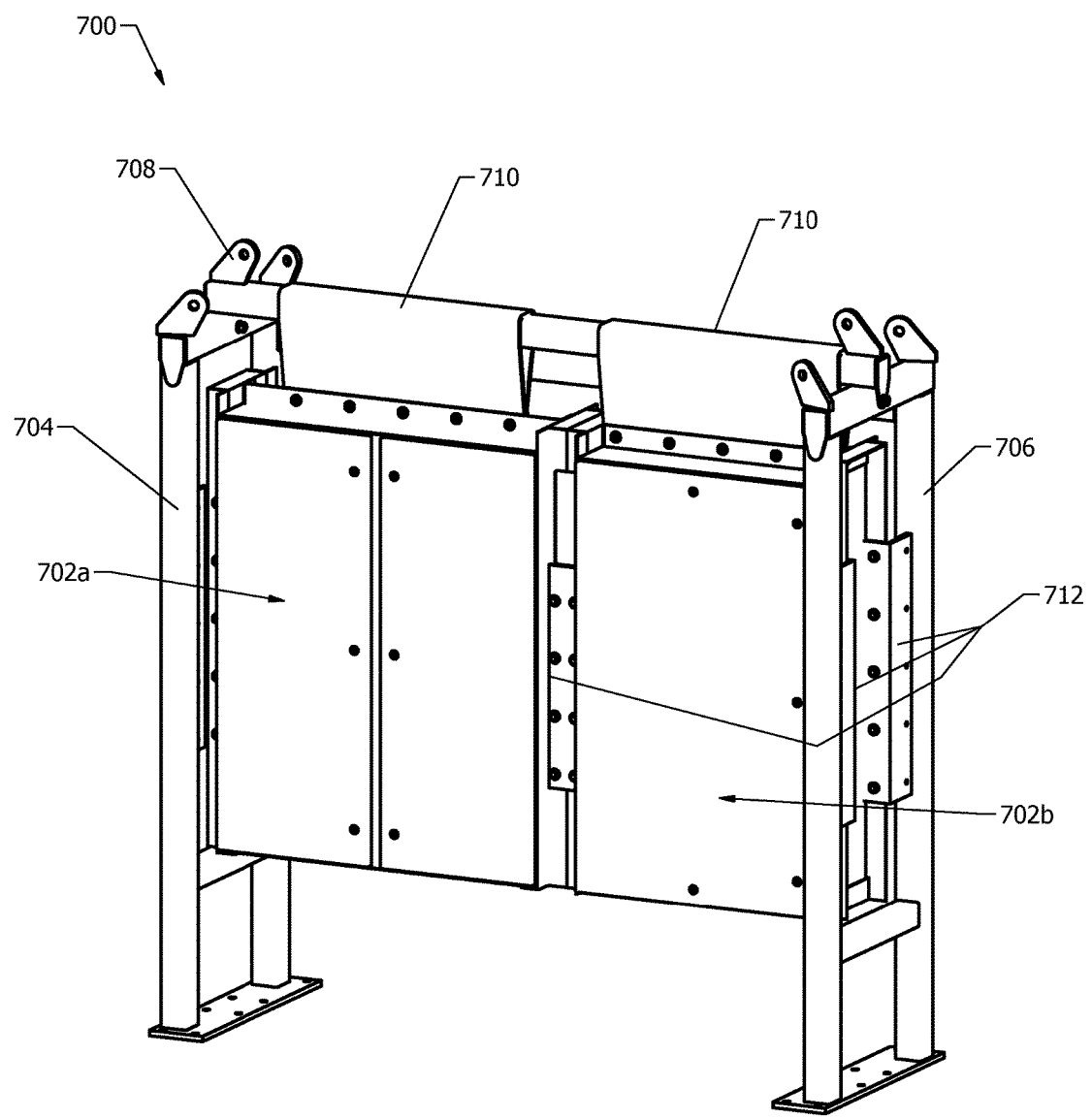
FIG. 7A is a perspective view of another vibration isolation device for vibrationally isolating a plurality of electronic control housings, according to at least one embodiment described herein.
Figure 7B:
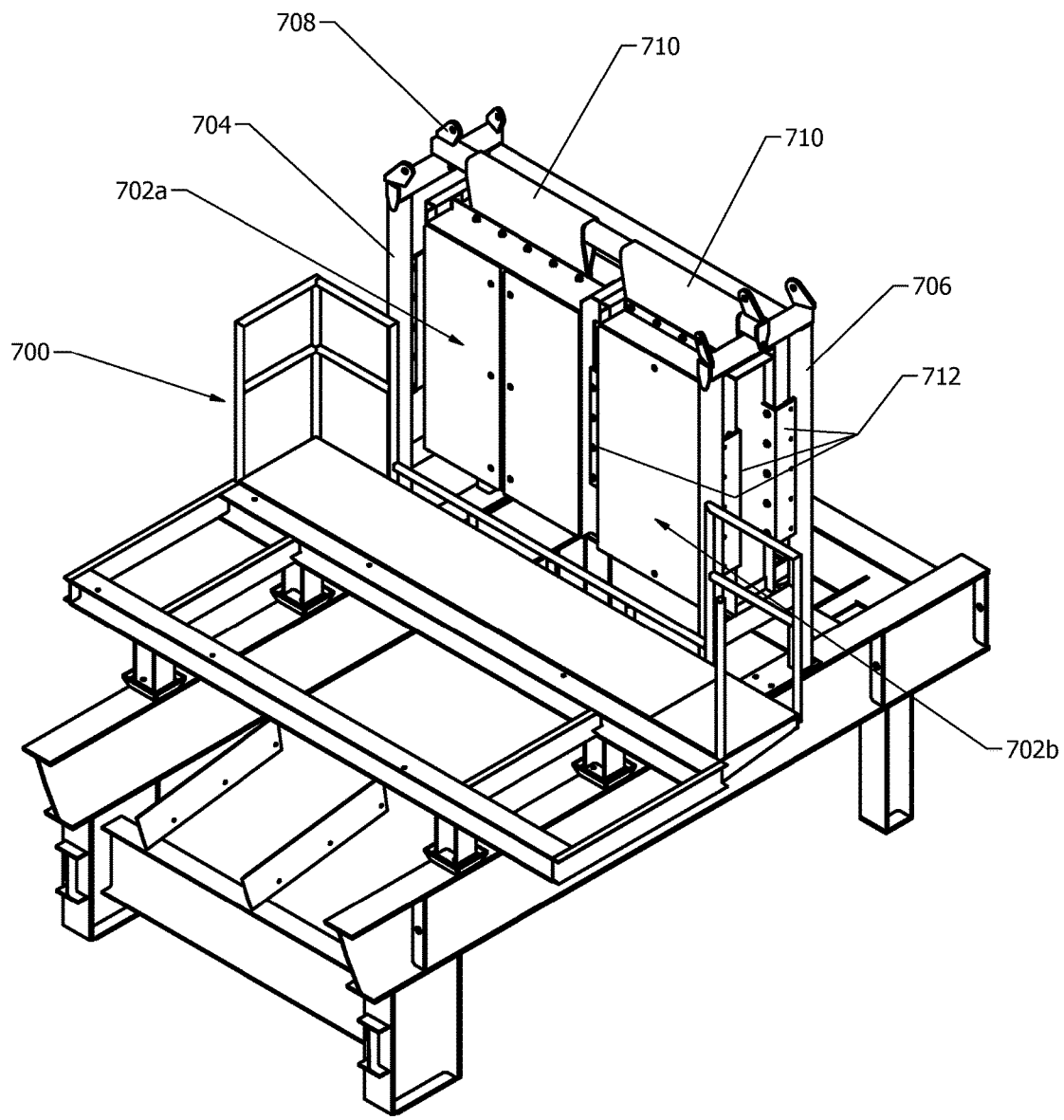
FIG. 7B is a perspective view of a vibration isolation device for vibrationally isolating a plurality of electronic control housings mounted to a rock crushing machine, according to at least one embodiment described herein.

FIG. 7A depicts an embodiment according to the present disclosure that may be used in heavy machinery applications. FIG. 7B depicts an embodiment according to the present disclosure as applied to a rock crushing machine. The embodiment illustrated in and elements described in relation to FIGS. 7A and 7B are example combinations of such elements, but contemplated combinations should not be considered inclusive of all recited elements or exclusive of additional elements. Additional embodiments may describe additional elements, which may be combined with elements of any other embodiment described herein.

Vibration isolation device 700 includes a first isolated member 702a and a second isolated member 702b suspended from a support frame 704. The support frame 704 may comprise a plurality of side supports 706 and a top support 708. The first and second isolated members 702a, 702b may each be suspended from a top support 708 by elastic suspension members 710. As shown in FIGS. 7A and 7B, elastic suspension members 710 may comprise elastic sheets that connect to a portion of or a substantially complete length of the first and second isolated members 702a, 702b. The first and second isolated members may also be connected to the plurality of side supports 706 and to one another by elastic dampening members 712, which may also comprise elastic sheets that connect to a portion of or a substantially complete height and/or of the first and second isolated members 702a, 702b. As is also depicted in FIGS. 7A and 7B, the vibration isolation device 700 may be mounted directly to a frame of a rock crushing machine as the sensitive electronic components are now vibrationally isolated.

Figure 8:
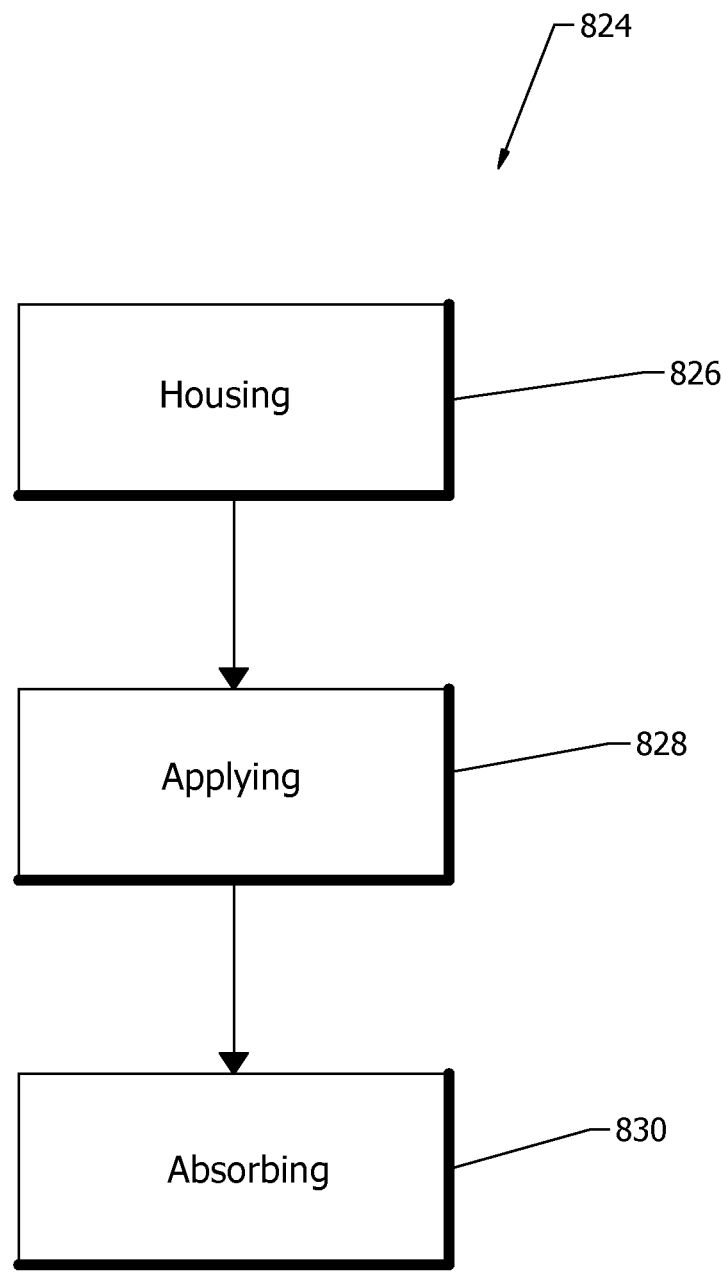
FIG. 8 is a flowchart illustrating a method of vibrational isolation of electronic components, according to at least one embodiment described herein.

FIG. 8 is a flowchart depicting a method 824 for the vibrational isolation of electronic components. The method 824 may include housing 826 electronic components in an isolated member located within a support frame. The isolated member may be connected to the support frame by a plurality of elastic members, where at least two of the elastic members are configured to apply forces having vectors at least about 90° from one another. The method 824 may then include applying 828 an input vibration to the support frame and absorbing 830 at least part of the energy from the input vibration. Absorbing 830 at least part of the energy from the input vibration may include displacing the isolated member away from an equilibrium position and restoring the isolated member to the equilibrium position such that restoring the isolated member takes more time that displacing the isolated member. In some embodiments, the kinetic of the input vibration and/or movement of the isolated member may be converted into heat in one or more of the plurality of elastic members. For example, the extension and contraction of the elastic members due to the input vibration and/or movement of the isolated member may be damped by the internal friction of the elastic members, which may in turn generate heat.

In some embodiments, the input vibration may be less than 200 Hz. In other embodiments, the input vibration may be less than 100 Hz. In yet other embodiments, the input vibration may be less than 40 Hz. In yet further embodiments, the input vibration may be less than 15 Hz. The input vibration may include a plurality of vibrational modes. For example, an input vibration may include a first frequency and a second frequency. The first frequency may be about 10 Hz and the second frequency may be about 200 Hz. The 10 Hz frequency may relate to vibrations produced by rock being crushed, while the 200 Hz frequency may relate to a drive motor or feed. In some embodiments, absorbing 830 at least part of the energy from the input vibration may include reducing a first amplitude of the input vibration at or near the first frequency and reducing a second amplitude of the input vibration at or near the second frequency by different amounts. For example, absorbing 830 at least part of the energy from the input vibration may include reducing a first amplitude of the input vibration at or near the first frequency more than a second amplitude of the input vibration at or near the second frequency.

Testing of an embodiment similar to or the same as vibration isolation device 700 described in relation to FIGS. 7A and 7B indicates the efficacy of a vibration isolation device in accordance with the present disclosure. During operation of a rock crushing machine, a vibration isolation device was connected to the machine. A vibration measurement device was mounted to directly to a support frame of the vibration isolation device and to an isolated member of the vibration isolation device during. Maximum peak particle velocities ("PPV") were measured during operation of the rock crushing machine in three axes (longitudinal, transverse, and vertical). PPV is a measurement of the rate of movement of the sensor due to vibrations traveling through the system. It may also be thought of as a product of amplitude and frequency of the vibrations traveling through the system.

Table 1 depicts the averaged values of tests depicting the reduction in PPV and, hence, measurable vibrations transmitted to the isolated member during operation of the rock crushing machine. The vibration measurement device was rotated 90° between data collection runs to minimize any systemic variation within the vibration measurement device. The measured vibrations at the support frame may be approximately equal to the input vibrations from the rock crushing machine.

TABLE 1

| Average PPV Measurement (inches/second) | | | |
| --- | --- | --- | --- |
| Location | Longitudinal PPV | Transverse PPV | Vertical PPV |
| Isolated Member | 1.2315 | 3.7155 | 1.798 |
| Support Frame | 1.549 | 4.2905 | 2.8975 |
| % Reduction | 20.50% | 13.40% | 37.95% |

Table 2 depicts the associated change in dominant frequency in measured vibration between the support frame and the isolated member. The dominant frequency (DF) may shift toward a higher frequency due to greater dampening on the lower frequency (i.e., longer duration) vibrations applied to the support frame.

TABLE 2

| Average Dominant Frequency Measurement (Hertz) | | | |
| --- | --- | --- | --- |
| Location | Longitudinal DF | Transverse DF | Vertical DF |
| Isolated Member | 11.25 | 11.15 | 10.1 |
| Support Frame | 9.75 | 8.6 | 6.2 |

The increase in frequency is associated with a decrease in amplitude indicated by the overall reduction in maximum PPV, as described. In at least one embodiment, a vibration isolation device in accordance with the present disclosure may therefore preferentially isolate low frequency vibrations. Testing data shows that while the isolated member may experience an overall reduction in the vibrational energy and/or movement relative to the input vibrations experienced by the support frame, the isolated member experiences vibrational energy that is preferentially reduced at lower frequencies, such as below 10 Hz.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A device for vibrational isolation, the device comprising:
   a first isolated member;
   a second isolated member;
   a support frame having an upper support, a first side support, and a second side support;
   one or more elastic sheet suspension members supporting the first isolated member from the upper support of the support frame, the one or more elastic sheet suspension members being secured to both the first isolated member and the upper support such that the first isolated member hangs from the upper support via the one or more elastic sheet suspension members; and
   a plurality of elastic dampening members connecting the first and second isolated members to the first and second side supports of the support frame, a first side of the first isolated member being connected to the first side support by one or more elastic dampening members of the plurality of elastic dampening members, a second side of the first isolated member being connected to the second isolated member by one or more elastic dampening members of the plurality of elastic dampening members, and a second side of the second isolated member being connected to the second side support by one or more elastic dampening members of the plurality of elastic dampening members.

2. The device of claim 1, wherein the one or more elastic sheet suspension members have a first modulus of elasticity and the plurality of elastic dampening members have a second modulus of elasticity, the first modulus of elasticity being greater than the second modulus of elasticity.

3. The device of claim 1, wherein the one or more elastic sheet suspension members and the plurality of elastic dampening members comprise the same material.

4. The device of claim 1, wherein the plurality of elastic dampening members comprise upper elastic dampening members and lower elastic dampening members.

5. The device of claim 4, wherein the upper elastic dampening members have a second modulus of elasticity, and the lower elastic dampening members have a third modulus of elasticity, the second modulus of elasticity being greater than the third modulus of elasticity.

6. The device of claim 1, further comprising one or more elastic sheet suspension members supporting the second isolated member from the upper support of the support frame, the one or more elastic sheet suspension members being secured to both the second isolated member and the upper support such that the second isolated member hangs from the upper support via the one or more elastic sheet suspension members.

7. The device of claim 6, further comprising one or more elastic sheet suspension members connecting the second isolated member to the top support of the support frame, the one or more elastic sheet suspension members being configured to suspend the second isolated member from the top support of the support frame, wherein the one or more elastic sheet suspension members are configured to apply a force to the second isolated member, the force applied by the one or more elastic sheet suspension members having a vector component substantially opposing gravity.

8. A vibration isolation device for the vibrational isolation of electronic components, the device comprising,
   a first isolated member;
   a second isolated member;
   a support frame having a top support, a first side support, and a second side support; and
   a plurality of elastic sheet dampening members connecting the first and second side supports of the support frame to the first and second isolated members, at least one elastic sheet dampening member of the plurality of elastic sheet dampening members connects a first side of the first isolated member to the first side support, at least one elastic sheet dampening member of the plurality of elastic sheet dampening members connects a second side of the first isolated member to a first side of the second isolated member, at least one elastic sheet dampening member of the plurality of elastic sheet dampening members connects a second side of the second isolated member to the second side support, the elastic sheet dampening member that connects the first isolated member to the first side support and the elastic sheet dampening member that connects the second isolated member to the second side support are each configured to apply a force to the connected isolated member, the force applied by each elastic sheet dampening member having a vector component pointing away from the isolated member from a first point at which the elastic sheet dampening member is connected to the isolated member to a second point at which the elastic sheet dampening member is connected to the first or second side support of the support frame, wherein the vector component of the force applied by each elastic sheet dampening member is configured to substantially oppose a vector component of a force applied by another elastic sheet dampening member.

9. The device of claim 8, wherein the plurality of elastic sheet dampening members is disposed symmetrically about at least two reflection planes.

10. The device of claim 8, wherein the plurality of elastic sheet dampening members is disposed symmetrically about a point of inversion.

11. The device of claim 8, wherein the plurality of elastic sheet dampening members are configured to counteract swaying of the first isolated member.

12. The device of claim 8, further comprising one or more elastic sheet suspension members connecting the first isolated member to the top support of the support frame, the one or more elastic sheet suspension members being configured to suspend the first isolated member from the top support of the support frame, wherein the one or more elastic sheet suspension members are configured to apply a force to the first isolated member, the force applied by the one or more elastic sheet suspension members having a vector component substantially opposing gravity.

13. The device of claim 8, wherein one of the plurality of elastic sheet dampening members is configured to connect the first isolated member to the support frame along greater than 10% of the length of the first isolated member.

14. The device of claim 8, wherein one of the plurality of elastic sheet dampening members is configured to connect the first isolated member to the support frame along greater than 20% of the length of the first isolated member.

15. The device of claim 8, wherein one of the plurality of elastic sheet dampening members is configured to connect the first isolated member to the support frame along between 10% and 100% of the length of the first isolated member.

16. The device of claim 8, wherein one of the plurality of elastic sheet dampening members has a modulus of elasticity that is lower than a modulus of elasticity of the support frame.

17. The device of claim 8, wherein one of the plurality of elastic sheet dampening members comprises rubber.

18. The device of claim 8, wherein one of the plurality of elastic sheet dampening members comprises one or more of nitrile rubber, butyl rubber, epichlorohydrin rubber, ethylene propylene diene monomer rubber, gum rubber, polyethylene rubber, latex rubber, neoprene rubber polyurethane, santoprene rubber, styrene-butadiene rubber, silicone rubber, vinyl rubber, flouroelastomer rubber.

19. The device of claim 8, wherein the elastic sheet dampening members provide a reduction in PPV between the support frame and the first isolated member of at least 13.4%.

* * * * *